Aug. 4, 1931.　　　　J. M. HEALD　　　　1,817,372
METHOD OF AND MECHANISM FOR ADJUSTING MOWING MACHINES
Filed May 22, 1928
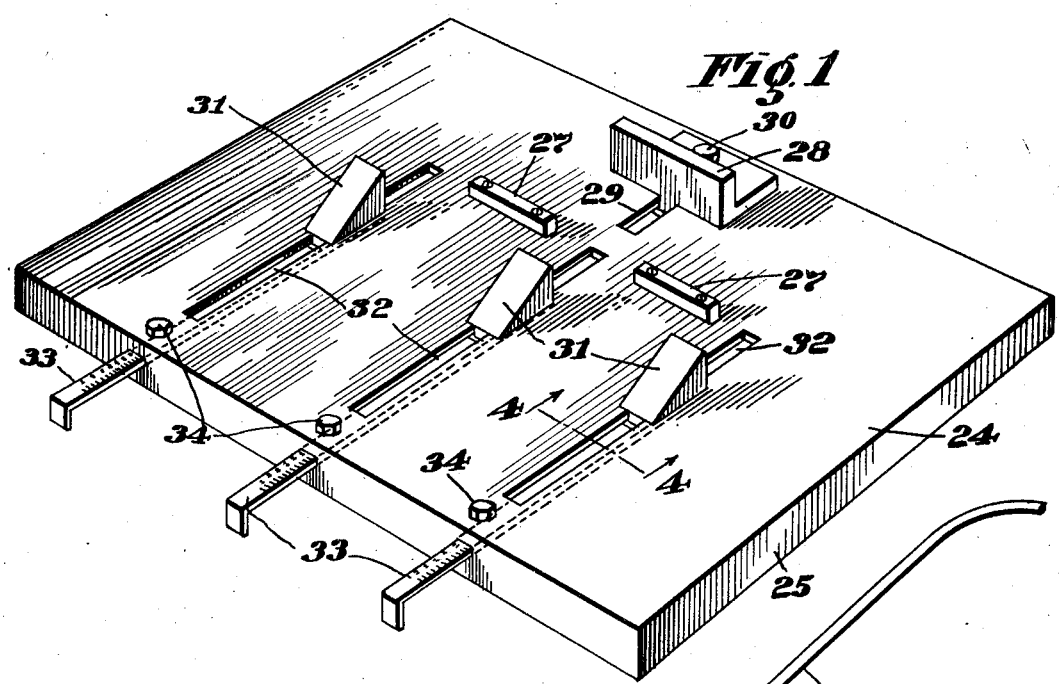
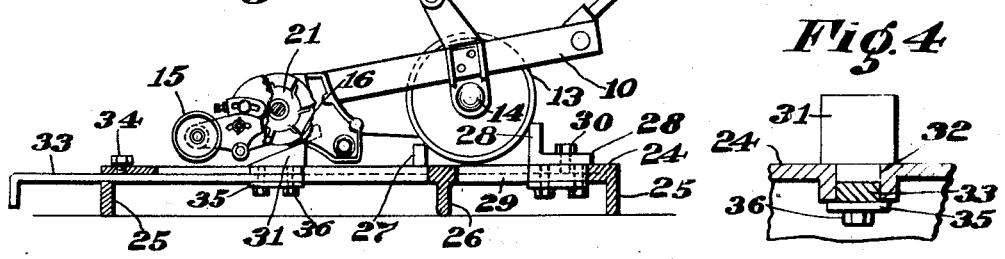
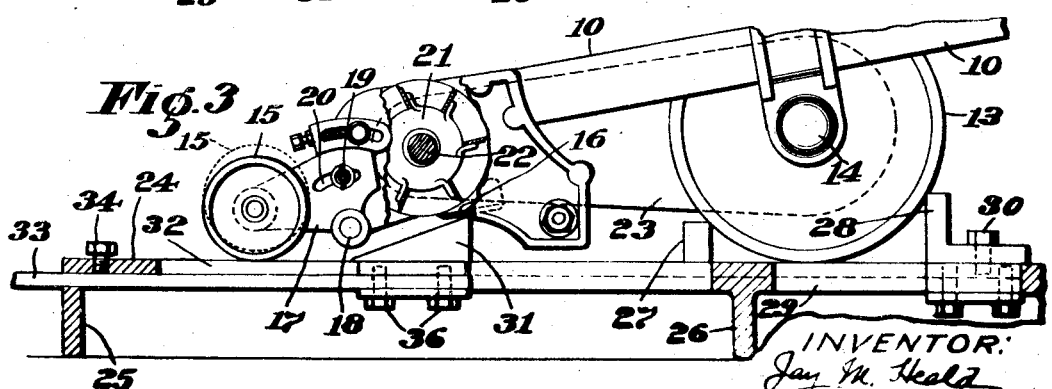
INVENTOR:
Jay M. Heald
BY Rob't R. Harris
ATTORNEY Patented Aug. 4, 1931

1,817,372

UNITED STATES PATENT OFFICE

JAY M. HEALD, OF GREENFIELD, MASSACHUSETTS

METHOD OF AND MECHANISM FOR ADJUSTING MOWING MACHINES

Application filed May 22, 1928. Serial No. 279,785.

The present invention relates to a method of adjusting mowing machines such as are employed upon golf links, fairways, putting greens and lawns so that they will cut grass to a predetermined length, and to mechanism for facilitating this adjustment.

When a number of mowing machines are employed to cut the grass upon an extensive lawn, golf links, fairways, or putting greens, it is desirable that the various mowing machines be adjusted to cut the grass to the same length so that the entire lawn or different fairways or putting greens when cut will have a neat, uniform appearance.

This is appreciated by persons having charge of the condition of the grounds of golf courses, parks, large estates, etc., but no simple practical method was known heretofore for adjusting the lawn or greens mowers so that the entire group of mowing machines employed upon the grounds would cut the grass to the same length.

The height to which grass will be cut by a mowing machine depends upon the distance the bed knife of the machines is supported from the ground by the roller or rollers that support one end of the mowing machine frame, and in most mowing machines the length of cut may be regulated by raising or lowering the supporting rollers with respect to the mowing machine frame.

While it is a relatively simple matter to adjust the position of these rollers to vary the length of cut, it has been difficult heretofore to adjust the rollers so that they will support the bed knife in accurate parallel relation with the ground, and it has been extremely difficult heretofore to adjust a number of mowing machines so that they would all cut the same, since the adjustment of each machine has been largely a matter of guess work, and no reliable means was known for insuring similar adjustment of two or more machines.

Having in mind the foregoing, the present invention relates to the method of and means for insuring the adjustment of successive mowing machines so that they will all cut the grass to the same height. More specifically the present invention relates to a mowing machine adjusting plate or base plate having means for supporting the bed knife parallel to and at a predetermined distance from the base plate so that the proper adjustment may be secured by simply lowering the frame supporting rollers into engagement with the base plate and clamping them in this position. As a result of this construction the various mowing machines may be adjusted on the base plate so that they will all cut grass to the same height and parallel to the ground.

The various features of the invention and novel combination of parts will be best understood from the following description, when read in connection with the accompanying drawings, showing one good practical form of the invention :—

In the drawings—

Fig. 1 is a perspective view of a base plate employed in adjusting mowing machines in accordance with the present invention;

Fig. 2 is a vertical central sectional view through the base plate of Fig. 1, a mowing machine being shown as mounted upon the base plate in position to have its knife supporting rollers adjusted;

Fig. 3 is a view similar to Fig. 2, but on an enlarged scale, the frame supporting rollers being shown in full lines in their lowered position and in dotted lines in their raised position; and Fig. 4 is a sectional view taken on the line 4—4 of Fig. 1.

The mechanism of the present invention may be employed in adjusting various types of mowing machines so that they will cut the grass to a desired or predetermined length, and is shown in the drawings as employed to adjust a greens mower having the adjustable rollers disposed in front of the cutter, but it will be understood that mowers having the adjustable roller at the rear of the cutter may also be adjusted in accordance with the present invention.

The greens mower shown in the drawings is of well known construction and is provided with a main frame 10 with which the upwardly extending handles 11 are secured, and are held in the elevated position by the connecting rods 12. The rear portion of the frame 10 is supported by the relatively large, heavy drum or drums 13 that are journaled on the transversely extending shaft 14. The front portion of the frame or carriage 10 is supported by the laterally spaced rollers 15 and these rollers are adjustably secured to the frame 10 so that they may be raised or lowered to vary the distance at which the bed knife 16 is supported from the ground. In the construction shown the adjustable connection between the rollers 15 and the carriage 10 consists of the side plates 17 which are pivotally secured at 18 to a downwardly extending portion of the frame 10 and the rollers 15 are journaled upon the forward ends of the side plates 17. The adjustment of the rollers 15 relatively to the frame 10 is effected by loosening the clamping nuts 19 provided upon bolts extending from a front portion of the carriage 10 through elongated slots 20 formed in the side plates 17. After the rollers 15 have been raised or lowered to the desired position they are then clamped in place by tightening up the clamping nuts 19.

Above the bed knife 16 of the mowing machine is supported the usual blade supporting reel 21 which rotates about the transversely extending shaft 22. This reel is driven from the drums 13 by a chain or series of gears enclosed within the casing 23, the construction being such that as the mowing machine is pushed forward over the lawn the reel 21 will be driven from the relatively heavy drum or drums 13 in a well known manner.

The construction and operation of the mowing machine shown and described forms no part of the present invention, but the foregoing brief description of the same is believed to be desirable to make clear the manner in which the same may be adjusted upon the adjusting device forming the subject matter of the present invention, and which will now be described.

The mower adjusting device shown in the drawings as one embodiment of the present invention consists of a base plate 24 which preferably has a flat upper surface as shown and is provided with downwardly extending flange 25 at its edges and with the intermediate flanges 26 which serve to strengthen the central portion of the base plate. It is desirable to prevent the mowing machine from moving or rolling upon the surface of the base plate during the adjusting operation and this may be readily prevented by providing the base plate 24 with the upwardly extending blocks 27 which are rigidly secured to the base plate in position to arrest the rotation of the drums 13 in one direction. The rolling or rotation of these drums in the opposite direction may be prevented by an adjustable stop or angle plate 28 which may be adjusted along the base plate into engagement with the opposite face of the drum 13, as will be apparent from Figs. 2 and 3. The angle plate 28 is provided with a downwardly extending key adapted to slide in the slot 29 formed in the upper face of the base plate and this stop may be clamped in the desired position of adjustment by tightening the clamping bolt 30.

In order to adjust the carriage supporting rollers 15 the present invention contemplates that the bed knife 16 will first be elevated a desired distance from the face of the base plate as shown in Fig. 2, and while various means might be provided for holding the bed knife 16 elevated the desired amount from the face of the base plate 24, the means illustrated in the drawings to this end consists of the wedges 31 which are slidably mounted upon the base plate 24 and each wedge 31 has a downwardly extending key which fits slidably in a slot 32 formed in the upper face of the base plate.

In the construction shown three sliding wedges 31 are provided, although this number may obviously be varied. It is desirable to provide means for adjusting these wedges to thereby increase or decrease the height at which the bed knife 16 will be supported by the wedges from the base plate, and to this end, in the construction shown, each wedge 31 is secured to an adjusting bar 33 the forward end of which extends through an opening in the forward face of the base plate and the adjusting bars 33 are preferably graduated as shown so that the desired adjustment of each wedge 31 may be secured by observing the graduations upon the adjusting bar to which the wedge is secured, and after the desired adjustment of the blocks 31 has been effected they may be secured in their adjusted position by tightening the set screws 34. Each sliding block 31 is retained in place in its guide slot 32 by the construction best shown in Fig. 4, wherein it will be seen that a retaining plate 35 of greater width than the slot 32 is secured by bolts 36 against the under face of the base plate 24.

It will be seen from the foregoing description of the wedges 31 that they may be adjusted to the desired position by merely sliding the adjusting rods 33 within the base plate to the desired position of adjustment, as indicated by the graduations, and then the wedges 31 may be secured in their adjusted position by tightening the set screws 34. The wedges 31 will then support the bed knife 16 of the mowing machine at the desired elevation from the base plate 24, as will be apparent from Fig. 2; the desired adjustment of the mowing machine may then be effected by simply loosening the lock nuts 19 so that the supporting rollers 15 may be lowered into engagement with the upper face of the base plate 24, as shown in full lines in Fig. 3, whereupon the nuts 19 may be tightened to clamp the rollers 15 in their lowered position. The mowing machine is thus adjusted to cut grass to a predetermined height from the ground, and other mowing machines may be similarly adjusted so that they will cut grass at the same height from the ground by merely placing them upon the mower adjusting device, and adjusting the frame supporting rollers 15 of each mowing machine in the manner above described.

While the mower adjusting device forming the subject matter of the present invention may be employed to adjust various types of mowing machines so that they will cut the grass to a predetermined height from the ground, the device of the present invention is particularly well adapted for use upon golf courses to adjust the greens mowers employed to keep the putting grounds cut to form a short smooth velvet-like surface. It is important that the various putting grounds of the golf course be cut so that the grass will be of the same length on various greens.

The mower adjusting device of the present invention will also facilitate adjustment of the rollers 15 so that they will support the bed knife 16 parallel to the ground, which is important because if one end of the bed knife is supported a greater distance from the ground than its opposite end the lawn will not be cut evenly.

It has been extremely difficult heretofore to adjust the different greens mowers used to trim the grass upon the various putting greens of a golf course so that they will cut the grass to the same level on all of the greens. Through the employment of the present invention the various greens mowers employed for this purpose can be readily adjusted so that they will all cut grass to the same level, thus making it possible to maintain the various putting greens in the same condition upon the entire golf course.

What is claimed is:—

1. The method of adjusting a lawn or greens mowing machine to cut grass to a predetermined height which consists in supporting the mower bed knife elevated a predetermined distance from and parallel to a supporting surface for the mower, then lowering the carriage supporting roller or rollers of the mower into engagement with said surface and securing the rollers in this lowered position so that they will support the bed knife parallel to and at a predetermined distance from the ground.

2. A mower setting device for use in adjusting a lawn or greens mowing machine so that it will cut grass evenly and at a predetermined distance from the ground, comprising in combination, a base plate adapted to support a mowing machine during adjustment and provided with stops for holding the machine in place thereupon, and means upon the base plate for holding the mower bed knife elevated a predetermined distance from and parallel to the base plate while the ground engaging roller or rollers are lowered into engagement with the base plate and secured in the lowered position to support the bed knife parallel to and at a predetermined distance from the ground.

3. A mower setting device for use in adjusting a lawn or greens mowing machine so that it will cut grass evenly and at a predetermined distance from the ground, comprising in combination, a base plate adapted to support a mowing machine during adjustment and provided with stops for holding the machine in place thereupon, and adjustable means mounted upon the base plate to engage the mower bed knife and hold it elevated and parallel to the base plate while the ground engaging roller or rollers are lowered into engagement with the base plate and secured in this lowered position to support the bed knife at a predetermined distance from the ground.

4. A mower setting device for use in adjusting a lawn or greens mowing machine so that it will cut grass parallel to and at a predetermined distance from the ground, comprising in combination, a base plate adapted to support a mowing machine provided with a frame and supporting rollers during adjustment and provided with means for holding the machine in place upon the base plate, knife supporting wedges mounted upon the base plate and adjustable to support the bed knife at different elevations from the base plate so that the frame supporting rollers may be lowered into engagement with the base plate and secured in the lowered position while the bed knife is supported by the wedges to thereby cause the rollers to support the bed knife parallel to and at a predetermined distance from the ground.

5. A mower setting device for use in adjusting a lawn or greens mowing machine so that it will cut grass parallel to and at a predetermined distance from the ground, comprising in combination, a base plate adapted to support a mowing machine during adjustment and provided with positioning blocks adapted to receive the ground engaging drum of the mower between them to hold the mower in place upon the base plate, and means upon the base plate for supporting the mower bed knife elevated a predetermined distance from and parallel to the base plate while the ground engaging rollers are lowered into engagement with the base plate and secured in this lowered position to support the bed knife parallel to and at a predetermined distance from the ground.

In testimony whereof, I have signed my name to this specification.

JAY M. HEALD